US012277126B2

(12) United States Patent
Balasubramanian et al.

(10) Patent No.: US 12,277,126 B2
(45) Date of Patent: Apr. 15, 2025

(54) METHODS AND SYSTEMS FOR SEARCH AND RANKING OF CODE SNIPPETS USING MACHINE LEARNING MODELS

(71) Applicant: Open Weaver Inc., Miami, FL (US)

(72) Inventors: Ashok Balasubramanian, Chennai (IN); Arul Reagan S, Chengalpattu District (IN); Balaji Munusamy, Chennai (IN); Karthikeyan Krishnaswamy Raja, Chennai (IN)

(73) Assignee: OPEN WEAVER INC., Miami, FL (US)

( * ) Notice: Subject to any disclaimer, the term of this patent is extended or adjusted under 35 U.S.C. 154(b) by 0 days.

(21) Appl. No.: 18/217,490

(22) Filed: Jun. 30, 2023

(65) Prior Publication Data

US 2025/0005026 A1    Jan. 2, 2025

(51) Int. Cl.
  *G06F 16/2457*    (2019.01)
  *G06F 16/248*    (2019.01)

(52) U.S. Cl.
  CPC ...... *G06F 16/24578* (2019.01); *G06F 16/248* (2019.01)

(58) Field of Classification Search
  CPC ............. G06F 16/24578; G06F 16/248; G06F 16/835; G06F 16/8373; G06F 8/20; G06F 8/34
  See application file for complete search history.

(56) References Cited

U.S. PATENT DOCUMENTS

| 5,953,526 A | 9/1999 | Day et al. |
| 7,322,024 B2 | 1/2008 | Carlson et al. |

(Continued)

FOREIGN PATENT DOCUMENTS

| CN | 108052442 A | 5/2018 |
| KR | 10-2020-0062917 | 6/2020 |

(Continued)

OTHER PUBLICATIONS

M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).

(Continued)

*Primary Examiner* — James E Richardson
(74) *Attorney, Agent, or Firm* — Foley & Lardner LLP

(57) ABSTRACT

Systems and methods for automatically generating search list rankings of code snippets are provided. An exemplary method includes searching source code repositories to identify code snippets in response to a search query, assigning weight values to ranking parameters, and processing the code snippets using machine learning models to generate rating scores for each of the code snippets, where each rating score applies to a corresponding ranking parameter. The method includes generating a combined score for each of the code snippets by combining the rating scores for the code snippet according to the weight values assigned to the corresponding ranking parameters and generating and presenting a user interface including an ordered list of the code snippets based on the combined scores for the code snippets.

17 Claims, 10 Drawing Sheets

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 | 6/2016 | Smith | |
| 9,390,268 B1 | 7/2016 | Martini et al. | |
| 9,471,559 B2 | 10/2016 | Castelli et al. | |
| 9,558,098 B1 | 1/2017 | Alshayeb et al. | |
| 9,589,250 B2 | 3/2017 | Palanisamy et al. | |
| 9,626,164 B1 | 4/2017 | Fuchs | |
| 9,672,554 B2 | 6/2017 | Dumon et al. | |
| 9,977,656 B1 | 5/2018 | Mannopantar et al. | |
| 10,305,758 B1 | 5/2019 | Bhide et al. | |
| 10,474,509 B1 | 11/2019 | Dube et al. | |
| 10,484,429 B1 | 11/2019 | Fawcett et al. | |
| 10,761,839 B1 | 9/2020 | Migoya et al. | |
| 10,922,740 B2 | 2/2021 | Gupta et al. | |
| 10,983,760 B2 * | 4/2021 | Guan | G06N 5/01 |
| 11,023,210 B2 | 6/2021 | Li et al. | |
| 11,238,027 B2 | 2/2022 | Frost et al. | |
| 11,256,484 B2 | 2/2022 | Nikumb et al. | |
| 11,288,167 B2 | 3/2022 | Vaughan | |
| 11,294,984 B2 | 4/2022 | Kittur et al. | |
| 11,295,375 B1 | 4/2022 | Chitrapura et al. | |
| 11,301,631 B1 | 4/2022 | Atallah et al. | |
| 11,334,351 B1 | 5/2022 | Pandurangarao et al. | |
| 11,461,093 B1 | 10/2022 | Edminster et al. | |
| 11,474,817 B2 | 10/2022 | Sousa et al. | |
| 11,704,406 B2 | 7/2023 | Lee et al. | |
| 11,893,117 B2 | 2/2024 | Segal et al. | |
| 11,966,446 B2 * | 4/2024 | Socher | G06F 16/9535 |
| 12,034,754 B2 | 7/2024 | O'Hearn et al. | |
| 2001/0054054 A1 | 12/2001 | Olson | |
| 2002/0059204 A1 | 5/2002 | Harris | |
| 2002/0099694 A1 * | 7/2002 | Diamond | G06F 16/48 |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0104515 A1 | 5/2006 | King et al. | |
| 2006/0200741 A1 | 9/2006 | Demesa et al. | |
| 2006/0265232 A1 | 11/2006 | Katariya et al. | |
| 2007/0050343 A1 | 3/2007 | Siddaramappa et al. | |
| 2007/0168946 A1 * | 7/2007 | Drissi | G06F 8/36 |
| | | | 717/110 |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1 | 4/2010 | Rush et al. | |
| 2010/0121857 A1 | 5/2010 | Elmore et al. | |
| 2010/0122233 A1 | 5/2010 | Rath et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2013/0254744 A1 | 9/2013 | Sahoo et al. | |
| 2013/0326469 A1 | 12/2013 | Fox et al. | |
| 2014/0040238 A1 | 2/2014 | Scott et al. | |
| 2014/0075414 A1 | 3/2014 | Fox et al. | |
| 2014/0122182 A1 | 5/2014 | Cherusseri et al. | |
| 2014/0149894 A1 | 5/2014 | Watanabe et al. | |
| 2014/0163959 A1 | 6/2014 | Hebert et al. | |
| 2014/0188746 A1 | 7/2014 | Li | |
| 2014/0297476 A1 * | 10/2014 | Wang | G06F 16/335 |
| | | | 705/26.62 |
| 2014/0331200 A1 | 11/2014 | Wadhwani et al. | |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2015/0378692 A1 * | 12/2015 | Dang | G06F 8/36 |
| | | | 717/106 |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0063776 A1 | 3/2017 | Nigul | |
| 2017/0154543 A1 | 6/2017 | King et al. | |
| 2017/0177318 A1 * | 6/2017 | Mark | G06F 16/9535 |
| 2017/0220633 A1 | 8/2017 | Porath et al. | |
| 2017/0242892 A1 | 8/2017 | Ali et al. | |
| 2017/0286541 A1 | 10/2017 | Mosley et al. | |
| 2017/0286548 A1 | 10/2017 | De et al. | |
| 2017/0344556 A1 | 11/2017 | Wu et al. | |
| 2018/0046609 A1 | 2/2018 | Agarwal et al. | |
| 2018/0067836 A1 | 3/2018 | Apkon et al. | |
| 2018/0107983 A1 * | 4/2018 | Mir Ghaderi | G06Q 10/1053 |
| 2018/0114000 A1 | 4/2018 | Taylor | |
| 2018/0189055 A1 | 7/2018 | Dasgupta et al. | |
| 2018/0191599 A1 | 7/2018 | Balasubramanian et al. | |
| 2018/0329883 A1 | 11/2018 | Leidner et al. | |
| 2018/0349388 A1 | 12/2018 | Skiles et al. | |
| 2019/0026106 A1 | 1/2019 | Burton et al. | |
| 2019/0229998 A1 | 7/2019 | Cattoni | |
| 2019/0278933 A1 | 9/2019 | Bendory et al. | |
| 2019/0286683 A1 | 9/2019 | Kittur et al. | |
| 2019/0294703 A1 | 9/2019 | Bolin et al. | |
| 2019/0303141 A1 * | 10/2019 | Li | G06F 16/9024 |
| 2019/0311044 A1 | 10/2019 | Xu et al. | |
| 2019/0324981 A1 | 10/2019 | Counts et al. | |
| 2020/0097261 A1 * | 3/2020 | Smith | G06F 40/174 |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0301672 A1 | 9/2020 | Li et al. | |
| 2020/0301908 A1 | 9/2020 | Frost et al. | |
| 2020/0348929 A1 | 11/2020 | Sousa et al. | |
| 2020/0356363 A1 | 11/2020 | Dewitt et al. | |
| 2021/0049091 A1 | 2/2021 | Hikawa et al. | |
| 2021/0065045 A1 | 3/2021 | Kummamuru et al. | |
| 2021/0073293 A1 | 3/2021 | Fenton et al. | |
| 2021/0081189 A1 | 3/2021 | Nucci et al. | |
| 2021/0081418 A1 | 3/2021 | Silveira et al. | |
| 2021/0141863 A1 | 5/2021 | Wu et al. | |
| 2021/0149658 A1 | 5/2021 | Cannon et al. | |
| 2021/0149668 A1 | 5/2021 | Gupta et al. | |
| 2021/0256367 A1 | 8/2021 | Mor et al. | |
| 2021/0303989 A1 * | 9/2021 | Bird | G06F 16/95 |
| 2021/0349801 A1 | 11/2021 | Rafey | |
| 2021/0357210 A1 | 11/2021 | Clement et al. | |

(56) References Cited

U.S. PATENT DOCUMENTS

| | | |
|---|---|---|
| 2021/0382712 A1 | 12/2021 | Richman et al. |
| 2021/0397418 A1 | 12/2021 | Nikumb et al. |
| 2021/0397546 A1 | 12/2021 | Cser et al. |
| 2022/0012297 A1 | 1/2022 | Basu et al. |
| 2022/0083577 A1 | 3/2022 | Yoshida et al. |
| 2022/0107802 A1 | 4/2022 | Rao et al. |
| 2022/0197916 A1 | 6/2022 | Sarkar et al. |
| 2022/0215068 A1 | 7/2022 | Kittur et al. |
| 2022/0261241 A1 | 8/2022 | Balasubramanian et al. |
| 2022/0269580 A1 | 8/2022 | Balasubramanian et al. |
| 2022/0269687 A1 | 8/2022 | Balasubramanian et al. |
| 2022/0269743 A1 | 8/2022 | Balasubramanian et al. |
| 2022/0269744 A1 | 8/2022 | Balasubramanian et al. |
| 2023/0308700 A1 | 9/2023 | Perez |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).

Lampropoulos et al, "React—A Process for Improving Open-Source Software Reuse", IEEE, pp. 251-254 (Year: 2018).

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Andreas DAutovic, "Automatic Assessment of Software Documentation Quality", published by IEEE, ASE 2011, Lawrence, KS, USA, pp. 665-669, (Year: 2011).

Iderli Souza, An Analysis of Automated Code Inspection Tools for PHP Available on Github Marketplace, Sep. 2021, pp. 10-17 (Year: 2021).

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al, "Strategies for Software Reuse: A Principal Component Analysis of Reuse Practices", IEEE, pp. 825-837 (Year:2003).

Tung et al, "A Framework of Code Reuse in Open Source Software", ACM, pp. 1-6 (Year: 2014).

S. Bayati, D. Parson, T. Susnjakand M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 1 0. 1109/ICoICT.2015.7231398. (Year: 2015).

Chung-Yang et al. "Toward Since-Source of Software Project Documented Contents: A Preliminary Study", [Online], [Retrieve from Internet on Sep. 28, 2024], https://www.proquest.com/openview/c15dc8b34c7da061fd3ea39f1875d8e9/1?pq-origsite=gscholar&cbl=237699 (Year: 2011).

\* cited by examiner

| Text | Vectors/Embeddings (768 dimensional vector) |
|---|---|
| Elastic Search with Java | [2.0078897 5e-02, 2.26375 81e-02, -1.566088 41e-03, 4.87728743e-03, ...] |
| How do I upload a pdf to elasticsearch when using the elastic search java client? | [3.71290222e-02, 8.92147347e-02, 4.17148545e-02, 1.63118094e-02, ...] |
| How to index a pdf file using Elasticsearch ingest-attachment plugin? | [7.60004669e-03, -1.08761266e-02, 4.70924773e-04, 8.77264 51e-03, ...] |
| Indexing pdf/word using ingest-attachment plugin in elasticsearch via java code | [9.51290603e-03, 5.87605452e-03, -1.10732289e-02, 1.53554780e-02, ...] |
| Indexing PDF file in ElasticSearch using Java Code | [2.01268364e-02, 3.08451261e-02, 3.25926463e-03, 2.35397033e-02, ...] |
| | |
| | |

FIG. 4B

| Search query | |
|---|---|
| Text | Vector/Embedding (768 dimensional vector) |
| how to index pdf file in elastic search index using java | [2.04454865e-02, 1.92612242e-02, 4.45967587e-03, -1.83828454e-02,...] | vs

| Documents from selective clusters of vector store (vector database) | |
|---|---|
| Text | Vectors/Embeddings (768 dimensional vector) |
| Elastic Search with Java | [2.00783975e-02, 2.25357581e-02, -1.56608841e-03, 4.87728743e-03,...] |
| How do I upload a pdf to elasticsearch when using the elastic search java client? | [3.71290222e-02, 8.92147347e-02, 4.17148545e-02, -1.63118094e-02,...] |
| How to index a pdf file using Elasticsearch ingest-attachment plugin? | [7.60004669e-03, -1.08761266e-02, 4.70924773e-04, -8.77726451e-03,...] |
| Indexing pdf/word using ingest-attachment plugin in elasticsearch via java code | [9.51290503e-03, 5.87605452e-03, -1.10732289e-02, 1.53554780e-02,...] |
| Indexing PDF file in ElasticSearch using Java Code | [2.01268364e-02, 3.08451261e-02, 3.25926463e-03, -2.35397033e-02,...] |
| ... | ... |

FIG. 5B

METHODS AND SYSTEMS FOR SEARCH AND RANKING OF CODE SNIPPETS USING MACHINE LEARNING MODELS

TECHNICAL FIELD

The present disclosure relates generally to methods and systems for sorting and ranking code snippets based on user preferences and can be used in conjunction with a search engine for code snippets.

BACKGROUND

As the availability of open-source technologies, cloud-based public code repositories, and cloud-based applications increases exponentially, there is a need for software developers to efficiently find such code snippets for use in their software development. Today there are more than 30 million public code repositories and 100,000 public application-programming interfaces (APIs). Moreover, there are over 100 million articles that provide knowledge and review of such code snippets. Code snippets can be extracted from the public code repositories, public APIs, and the articles.

It may be difficult to find search such a large amount of technical documents to find relevant code snippets as requested by a user. Therefore, systems and methods for processing the technical documents, searching the technical documents, and surfacing any relevant code snippets for the user may be desired.

SUMMARY

There is provided, in accordance with an embodiment of the present invention a system to for automatically generating search list rankings of code snippets. The system includes one or more processors and memory storing instructions that, when executed by the one or more processors, cause the one or more processors to perform operations. The operations include searching one or more source code repositories to identify a plurality of code snippets in response to a search query, assigning a plurality of weight values to a plurality of ranking parameters, each of the plurality of ranking parameters corresponding to a different type of rating score for plurality of code snippets, processing the plurality of code snippets using the one or more machine learning models to generate a plurality of rating scores for each of the plurality of code snippets, wherein each rating score of the plurality of rating scores applies to a corresponding ranking parameter of the plurality of ranking parameters, generating a combined score for each of the plurality of code snippets, wherein the combined score for a code snippet is generated by combining the plurality of rating scores for the code snippet according to the plurality of weight values assigned to the corresponding ranking parameters, and generating and presenting a user interface comprising an ordered list of the plurality of code snippets based on the combined score for each of the plurality of code snippets.

In some embodiments, the ranking parameters include popularity score, a relevancy score, a recency score, an engagement score, and a document type score. The popularity score is a standardized measurement relative to a popularity of a code snippet. The relevancy score is a standardized measurement relative to a relevance of a code snippet to the search query. The recency score is a standardized measurement relative to how recently a code snippet was used. The engagement score is a standardized measurement relative to an amount of engagement a code snippet receives. The document type score is a standardized measurement relative to a type of document from which the code snippet was derived.

In some embodiments, the popularity score, the relevancy score, the recency score, the engagement score, and the document type score are normalized across provider data and third party data by a machine learning model.

In some embodiments, the popularity score is determined based on a number of views and/or user downloads of a code snippet across different providers of the code snippet, the different providers of the code snippet comprising a plurality of code repositories.

In some embodiments, the relevancy score is determined by computing a similarity between the code snippet and the search query based on a L2 Euclidian distance. In some embodiments, the engagement score is determined based on a number of clicks, comments, likes, and shares of a code snippet across different providers of the code snippet, the different providers of the code snippet comprising a plurality of code repositories.

In some embodiments, the operations include scanning, by a data-crawler, public repositories, cloud providers, Q&A sites, review sites, to retrieve information on popularity, relevancy, recency, engagement, and document type information regarding a code snippet and storing, by the data-crawler, the information to the one or more machine learning models.

In some embodiments, the operations include receiving a large volume of technical documents from a variety of sources, wherein the large volume of technical documents comprises at least 30 million documents, pre-processing the large volume of technical documents to extract relevant data, semantically vectorizing the technical documents using a pre-trained machine learning model, and storing the vectorized technical documents in a vector database.

One implementation of the present disclosure is a method of dynamic search listing ranking of code snippets. The method includes searching one or more source code repositories to identify a plurality of code snippets in response to a search query, assigning a plurality of weight values to a plurality of ranking parameters, each of the plurality of ranking parameters corresponding to a different type of rating score for plurality of code snippets, processing the plurality of code snippets using the one or more machine learning models to generate a plurality of rating scores for each of the plurality of code snippets, wherein each rating score of the plurality of rating scores applies to a corresponding ranking parameter of the plurality of ranking parameters, generating a combined score for each of the plurality of code snippets, wherein the combined score for a code snippet is generated by combining the plurality of rating scores for the code snippet according to the plurality of weight values assigned to the corresponding ranking parameters, and generating and presenting a user interface comprising an ordered list of the plurality of code snippets based on the combined score for each of the plurality of code snippets.

In some embodiments, the ranking parameters include popularity score, a relevancy score, a recency score, an engagement score, and a document type score. The popularity score is a standardized measurement relative to a popularity of a code snippet. The relevancy score is a standardized measurement relative to a relevance of a code snippet to the search query. The recency score is a standardized measurement relative to how recently a code snippet was used. The engagement score is a standardized measurement relative to an amount of engagement a code snippet receives. The document type score is a standardized measurement relative to a type of document from which the code snippet was derived.

In some embodiments, the popularity score, the relevancy score, the recency score, the engagement score, and the document type score are normalized across provider data and third party data by a machine learning model.

In some embodiments, the popularity score is determined based on a number of views and/or user downloads of a code snippet across different providers of the code snippet, the different providers of the code snippet comprising a plurality of code repositories.

In some embodiments, the relevancy score is determined by computing a similarity between the code snippet and the search query based on a L2 Euclidian distance. In some embodiments, the engagement score is determined based on a number of clicks, comments, likes, and shares of a code snippet across different providers of the code snippet, the different providers of the code snippet comprising a plurality of code repositories.

In some embodiments, the method further includes scanning, by a data-crawler, public repositories, cloud providers, Q&A sites, review sites, to retrieve information on popularity, relevancy, recency, engagement, and document type information regarding a code snippet and storing, by the data-crawler, the information to the one or more machine learning models.

In some embodiments, the method further includes receiving a large volume of technical documents from a variety of sources, wherein the large volume of technical documents comprises at least 30 million documents, pre-processing the large volume of technical documents to extract relevant data, semantically vectorizing the technical documents using a pre-trained machine learning model, and storing the vectorized technical documents in a vector database.

Another implementation of the present disclosure relates to one or more non-transitory computer-readable media storing instructions thereon. The instructions, when executed by one or more processors, cause the one or more processors to search one or more source code repositories to identify a plurality of code snippets in response to a search query, assigning a plurality of weight values to a plurality of ranking parameters, each of the plurality of ranking parameters corresponding to a different type of rating score for plurality of code snippets, process the plurality of code snippets using the one or more machine learning models to generate a plurality of rating scores for each of the plurality of code snippets, wherein each rating score of the plurality of rating scores applies to a corresponding ranking parameter of the plurality of ranking parameters, generate a combined score for each of the plurality of code snippets, wherein the combined score for a code snippet is generated by combining the plurality of rating scores for the code snippet according to the plurality of weight values assigned to the corresponding ranking parameters, and generate and presenting a user interface comprising an ordered list of the plurality of code snippets based on the combined score for each of the plurality of code snippets.

In some embodiments, the ranking parameters include popularity score, a relevancy score, a recency score, an engagement score, and a document type score. The popularity score is a standardized measurement relative to a popularity of a code snippet. The relevancy score is a standardized measurement relative to a relevance of a code snippet to the search query. The recency score is a standardized measurement relative to how recently a code snippet was used. The engagement score is a standardized measurement relative to an amount of engagement a code snippet receives. The document type score is a standardized measurement relative to a type of document from which the code snippet was derived.

In some embodiments, the popularity score, the relevancy score, the recency score, the engagement score, and the document type score are normalized across provider data and third party data by a machine learning model.

In some embodiments, the popularity score is determined based on a number of views and/or user downloads of a code snippet across different providers of the code snippet, the different providers of the code snippet comprising a plurality of code repositories.

In some embodiments, the relevancy score is determined by computing a similarity between the code snippet and the search query based on a L2 Euclidian distance. In some embodiments, the engagement score is determined based on a number of clicks, comments, likes, and shares of a code snippet across different providers of the code snippet, the different providers of the code snippet comprising a plurality of code repositories.

BRIEF DESCRIPTION OF THE DRAWINGS

The following drawings are illustrative of particular examples for enabling systems and methods of the present disclosure, are descriptive of some of the methods and mechanism, and are not intended to limit the scope of the invention. The drawings are not to scale (unless so stated) and are intended for use in conjunction with the explanations in the following detailed description.

FIGS. 4A-4B show a process for pre-processing and vectorizing technical documents containing code snippets, according to some embodiments.

FIGS. 5A-5B show a process of using ranking parameters for dynamic search listing ranking of code snippets, according to some embodiments.

Figure 1:
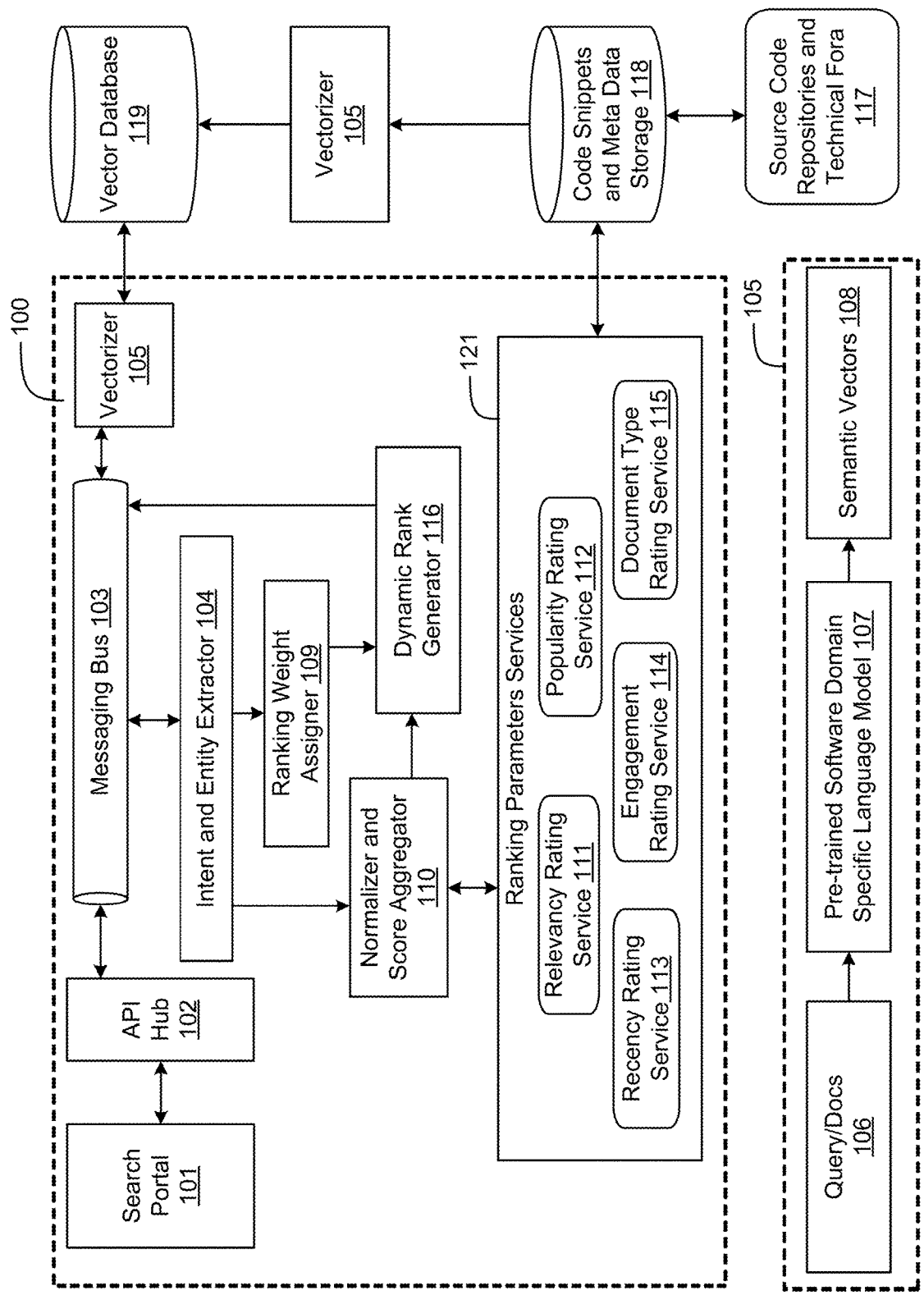
FIG. 1 shows an example high-level architecture of a system to perform dynamic search listing ranking of code snippets, according to some embodiments.

Persons skilled in the art will appreciate that elements in the figures are illustrated for simplicity and clarity and may represent both hardware and code snippets of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

A code snippet may refer to a portion of code (e.g., source code, machine code, code comments/text, etc.) which may be reusable. Typically, a developer may incorporate one or more code snippets into their software development project to write code more quickly and effectively. For example, a software development project may be created by a team consisting of multiple developers. In such a case, the team may maintain a library of code snippets which each of the multiple developers may use to complete the project more efficiently and to ensure consistency across the project.

In the current state of the art, finding high quality code snippets may prove challenging. For example, a user may use a typical search engine (e.g., Google, Bing, Yahoo, DuckDuckGo, etc.) to search for a code snippet. However, typically, millions of results may be returned which may make it difficult to find the code snippet the user is searching for. For example, the user may need to scan multiple websites, read through the reviews, and eventually test a code snippet to determine whether the code snippet is good to use. Thus, the process for finding relevant and effective code snippets may be laborious and inefficient. Therefore, systems and methods for finding, ranking, and presenting relevant and effective code snippets may be desired.

The present subject matter discloses a method and system for generating a search listing ranking of code snippets. In some embodiments, to help the developer choose a right code snippet for their software project, a system of the present subject matter will compute scores for popularity, relevancy, recency, engagement, and type of document of the code snippet. The computed score is then used to prioritize and rank the code snippet based on the developer preferences, thereby eliminating significant search effort across multiple websites for relevant and effective code snippets. This will also reduce any manual and/or interpretation errors and help the developer choose the right code snippet every time.

In some embodiments, the method and system for generating a search listing ranking of code snippets may be implemented using a combination of artificial intelligence (AI) techniques (e.g., artificial intelligence models, machine learning models, neural network models, generative large language models, etc.), natural language processing techniques, classification models, and generating/training components for training the various AI models to identify and extract relevant code snippets from a large volume of technical documents (e.g., over 30 million documents). The computational complexity of the systems and methods described herein are such that a human mind could not practically perform such computations mentally even with the physical aids such as pen and paper. For example, a human could not mentally or manually scan a database having a large number of technical documents (e.g., over 30 million technical documents) and fora to identify relevant code snippets within a practical time period required to provide a response to a search request (e.g., within minutes or seconds). A human also could not mentally or manually execute the various machine learning models described herein to generate rating scores for a large number of code snippets for many different ranking parameters within a practical time period required to provide a response to a search request.

Advantageously, the systems and methods for generating a search listing ranking of code snippets provide a technical solution of more efficiently and intelligently, using artificial intelligence, generating a ranked list of relevant code snippets based on a query received from a user. The systems and methods described herein also provide a technical improvement to the field of software programing (e.g., for computers or other devices) by providing an efficient and automated system for identifying relevant code snippets for use in developing software programs. As mentioned above, software developers may utilize code snippets to write software code more efficiently and effectively. Therefore, by providing an intelligent ranked list of relevant code snippets, the systems and methods described herein provide a technical improvement of higher quality software code which may be developed more efficiently.

FIG. 1 shows an example high-level architecture of system 100 to perform dynamic search listing ranking of code snippets, according to some embodiments. The system 100 includes an application programming interface (API) hub 102, a messaging bus 103, an intent and entity extractor 104, a vectorizer 105, a ranking weight assigner 109, a normalizer and score aggregator 110, and a ranking repository storing a one or more raking parameters. The ranking parameters may include a relevancy rating service 111, a popularity rating service 112, a recency rating service 113, an engagement rating service 114, and a document type rating service 115. In some embodiments, the system 100 may be coupled to one or more internal or external storage modules including a vector database 119, code snippets and meta data storage 118, and source code repositories and technical fora 117.

The system 100 also includes a search portal 101 to perform the task of dynamic search listing ranking of code snippets given the list of code snippets that is potentially generated from the search portal 101. In some embodiments, the search portal 101 captures and transmits a search query or request, ranking needs, and user preferences to the system 100. For example, the search portal 101 may capture the search request, ranking needs, and user preferences inputted by a user. After processing of the request, the search portal 101 will incorporate and display the listing that it receives.

The request from search portal 101 is transmitted to the API hub 102, which acts as a gateway for accepting and transmitting all requests. The API hub 102 hosts web services for receiving the requests and creating request messages to provide to the messaging bus 103. In some embodiments, the message bus 103 is coupled to the intent and entity extractor 104 which is configured to evaluate the search query to determine the intent of the query and any entities associated with the search query. For example, a search query may be "how to extract break tag text in python." The intent and entity extractor 104 may evaluate the search query to determine the entity associated with query (e.g., python) and the intent of the query (e.g., extract break tag). The identified intent and entities may help the system refine and filter the search for code snippets.

Based on the intent and entities extracted, the normalizer and score aggregator 110 processes a list of code snippets from the search or a similar listing system and a request for ranking parameters for which ranking information is requested. For example, ranking parameters may be inputted by the user and captured by the search portal 101. Based on the ranking parameters, the normalizer and score aggregator 110 calls all or some of a number of services 121 such as the relevancy rating service 111, a popularity rating service 112, the recency rating service 113, the engagement rating service 114, and the document type rating service 115. The above-mentioned relevancy rating service 111, a popularity rating service 112, the recency rating service 113, the engagement rating service 114, and the document type rating service 115 may be referred to as "services 121," hereinafter. The services 121 may generate scores for ranking parameters of the code snippets. The normalizer and score aggregator 104 then collates the ranking score from these services 121 and returns a pair value along with the respective parameter. The generation of ranking score is described in further detail below with respect to FIGS. 3-7.

The ranking weight assigner 109 leverages machine learning technologies to compute weights or priorities of the different ranking parameters including, but not limited to a popularity score of a code snippet, a relevancy score of the code snippet, a recency score of the code snippet, an engagement score of the code snippet, and a document type score of a code snippet. The scores of the different ranking parameters are computed based on the ranking request, the component, and the user preferences of this user and/or all other users using similar code snippets. For example, equal weight may be assigned to all the ranking parameters while in another example, some ranking parameters may be assigned more weight than the other ranking parameters. In an example, the ranking weight assigner 109 may assign weight based on a predetermined criteria or as indicated in case-to-case basis.

In some embodiments, a large volume of technical documents may be collected and stored by the source code repositories and technical fora 117 (which may herein be referred to as database 117). In some embodiments, the technical documents may be collected by an internet crawler which scours the internet sources including, but not limited to, public repositories (e.g., GitHub, etc.), cloud providers, Q&A sites (e.g., Stack Overflow), and review sites to parse and store information on popularity, relevancy, recency, engagement, and document type information into the database 117. The information stored in the file storage 114 may be used by the services 121 to determine scores of various ranking parameters.

In some embodiments, the technical documents from the database 117 may be pre-processed and parsed to extract any code snippets which may be within the source code and technical fora. For example, technical fora such as the Stack Overflow website may be parsed to extract any code snippets included on the website. The code snippets may then be stored in the code snippets and meta data storage 118 (herein referred to as storage 118). The storage 118 may be coupled to the system 100 and is configured to provide any available code snippets to the system 100 for ranking.

In some embodiments, the code snippets stored in storage 118 may be vectorized by vectorizer 105. In some embodiments, the vectorizer 105 is configured to receive a user query or technical documents 106. The user query or technical documents 106 may then be ingested by a pre-trained software domain specific language model 107 which is configured to convert the user query or technical documents 106 into semantic vectors 108. The model 107 is trained using a large quantity of documents on domain specific language (e.g., technical documents to understand the intricacies of the terminologies involved in a particular software engineering domain). The trained model 107 may then be configured to ingest queries or technical documents in an unstructured format (e.g., natural language) and then transform the unstructured input into vectors 108. For example, the code snippets found in the query or technical documents 106 may be converted into semantic vectors using the model 107. In some embodiments, the vectorizer 105 may be configured to convert code snippets which may be in stored in the storage 118 into a numerical values. Vectorization is a natural language processing technique in which words are converted to a corresponding vector of numerical values which may be used to find similarities between code snippets stored in storage 118 and the query submitted by the user. In some embodiments, the system 100 may also include another vectorizer 105. The vectorizer 105 may be configured to receive the query from the user through the messaging bus 103. The vectorizer 105 may then be configured to convert the user query to a corresponding vector of numerical values which represent the query. In this way, the vectors of the query and the code snippets may be compared to find similarities between the query and the code snippets so that when a user submits a search query, relevant code snippets can be returned to the user. In some embodiments, the vectors of the query and the code snippets may be stored in the vectors database 119.

In some embodiments, the relevancy rating service 111 leverages machine learning technologies to calculate a relevancy score of code snippets from the list of the code snippets based on the information saved in the vector database 119. The relevancy rating service 111 determines how relevant a code snippet is to a user's query. For example, the relevancy rating service 111 may evaluate an intents and entities associated with the code snippet and determine how similar they are to the intents and entities associated with the query from the user. In some embodiments, the relevancy score is determined by computing a similarity between the code snippet and the search query based on a L2 Euclidian distance.

In some embodiments, the popularity rating service 112 leverages machine learning technologies to calculate the popularity score of code snippets from the list of the code snippets based on the information saved in the vector database 119. The popularity rating service 112 determines popularity ratings, such as number of stars or other forms of popularity rankings of the code snippets across different technical fora and code repositories to determine the popularity score of the code snippets. Thereafter the ratings across diverse sources for the code snippets are utilized.

In some embodiments, the recency rating service 113, leverages machine learning technologies to calculates a recency score of code snippets from the list of the code snippets based on the information saved in the vector database 119. The recency rating service 113 is determines how recently the code snippet was developed or released. Typically, code snippets which were released very recently may not have been tested enough and may include bugs which have not been discovered yet. In contrast, code snippets which were released a very long time ago may be outdated. Therefore, the recency score may indicate when the reliability of the code snippet based on when the code snippet was released or published.

In some embodiments, the engagement service 114, leverages machine learning technologies to calculates an engagement score of code snippets from the list of the code snippets based on the information saved in the vector database 119. The engagement rating service 112 determines on how much engagement the code snippet has received. For example, a code snippet published on the GitHub may include a number of likes, downloads, watches, etc. a code snippet may have. Therefore, the engagement score may be determined based on these metrics. In some embodiments, a higher amount of engagement may correspond to a higher engagement score.

In some embodiments, the document type rating service 115, leverages machine learning technologies to calculates a document type score of code snippets from the list of the code snippets based on the information saved in the vector database 119. The document type rating service 115 determines they type of technical document the code snippet was extracted from. In some embodiments, some technical documents may be more reliable than others. For example, code snippets from a trusted internal source code repository may be more reliable than code snippets from a community forum such as Stack Overflow where any user may publish code snippets. Therefore, code snippets which are from a document type which has been flagged as more reliable will receive a higher document type score.

In some embodiments, based on the scores generated by the different services 121 as described above and the weights assigned to each of the ranking parameter scores, the dynamic rank generator 116 computes the rank for each code snippet. The dynamic rank generator 116 may analyze the scores of each of the ranking parameters to determine a rank of the code snippets. Based on the score of the ranking parameters, the dynamic rank generator 116 may determine the rank of the code snippets. The top ranked code snippet may be presented as the best code snippet for the user. In an example, it is possible that multiple code snippets might have the same rank based on the score of the ranking parameters. In such cases, the dynamic rank generator 116 uses machine learning techniques to apply the user preferences to generate the ranking. In an example, after it is determined that the two code components have the same rank, the system 100 may prompt the user to input the user preference and, based on the user preference, the dynamic rank generator 116 may decide the rank of the code snippets that would otherwise have identical ranks.

In some embodiments, the system 100 may be coupled to a processing system 120 which is configured to receive a user query or technical documents 106. The user query or technical documents 106 may then be ingested by a pre-trained software domain specific language model 107 which is configured to convert the user query or technical documents 106 into semantic vectors 108.

Figure 2:
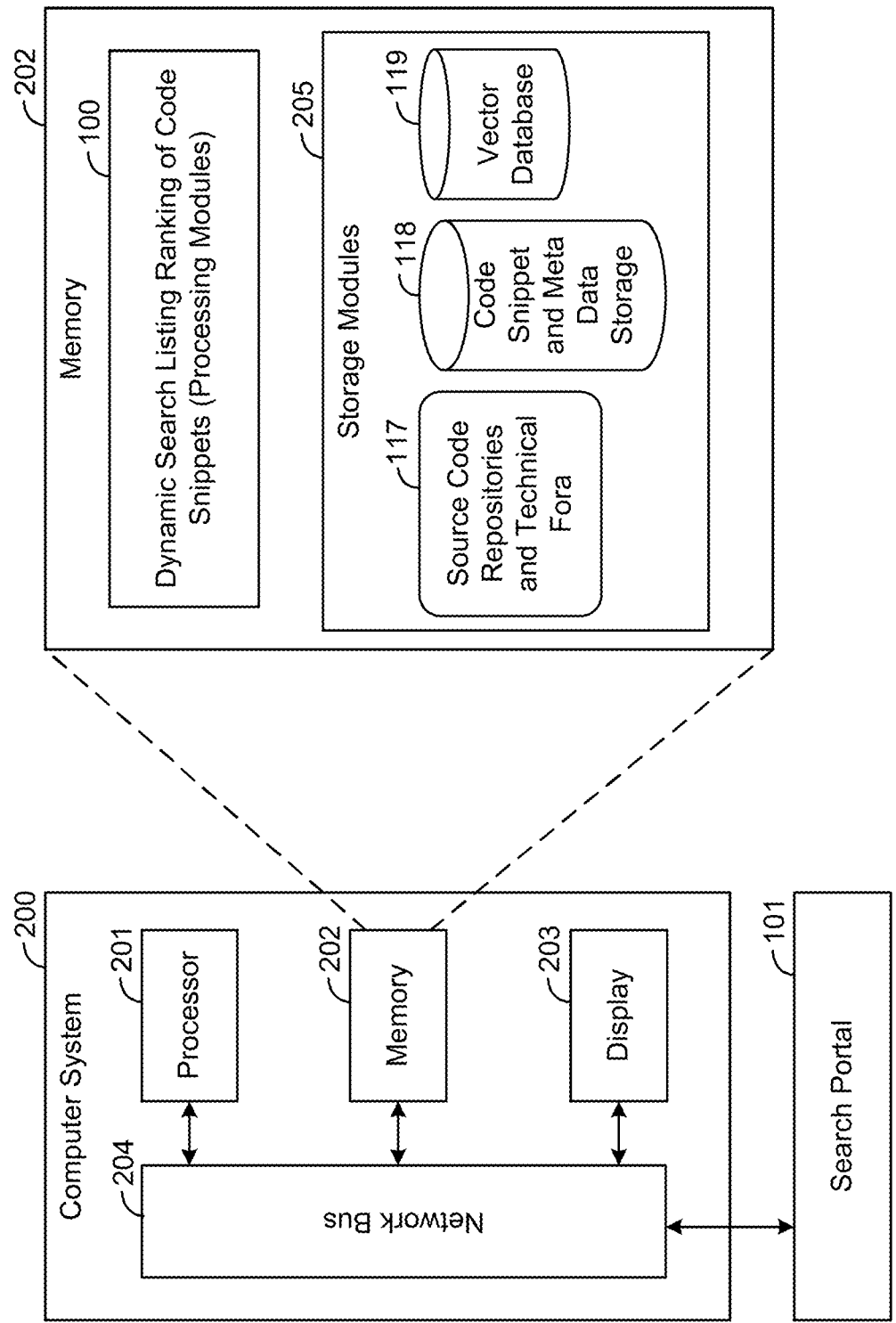
FIG. 2 shows a block view of a computer system implementation performing dynamic search listing ranking of code snippets, according to some embodiments.

FIG. 2 shows a block view of a computer system implementation 200 performing dynamic search listing ranking of code snippets, according to some embodiments. The system 200 can be a computing system, for example including a computer (e.g., personal computer, laptop, desktop, tablet, smartphone, etc.), a server, a cloud computing system, a combination of computers, etc. in various embodiments. This may include a processor 201 (e.g., one or more processors), memory 202 (e.g., one or more memory devices, computer-readable media, non-transitory memory, etc.), display 203, network bus 204, and other input/output like a mic, speaker, wireless card etc. The memory 202 stores program instructions that, when executed by the processor 201, cause the processor 201 to perform the operations described herein, according to various embodiments. The operations can include causing the display 203 to display a graphical user interface to a user relating to the operations described herein. As shown in FIG. 2, the processor 201, the memory 202, and the display 203 interoperate by communicating via network bus 204.

The dynamic search listing ranking of code snippet system 100, database 117, code snippet and metadata storage 118, and vector database 119 are stored in the memory 202 which provides the necessary machine instructions to the processor 201 to perform the executions for dynamic search listing ranking of code snippets. In embodiments, the processor 201 controls the overall operation of the system and manages the communication between the components through the network bus 204. The memory 202 holds the dynamic search listing ranking of code snippets system code, data, and instructions of the system processing modules 100 and several types of the non-volatile memory and volatile memory. The external search portal 101 interacts with the computer system via the network bus 204.

Figure 3:
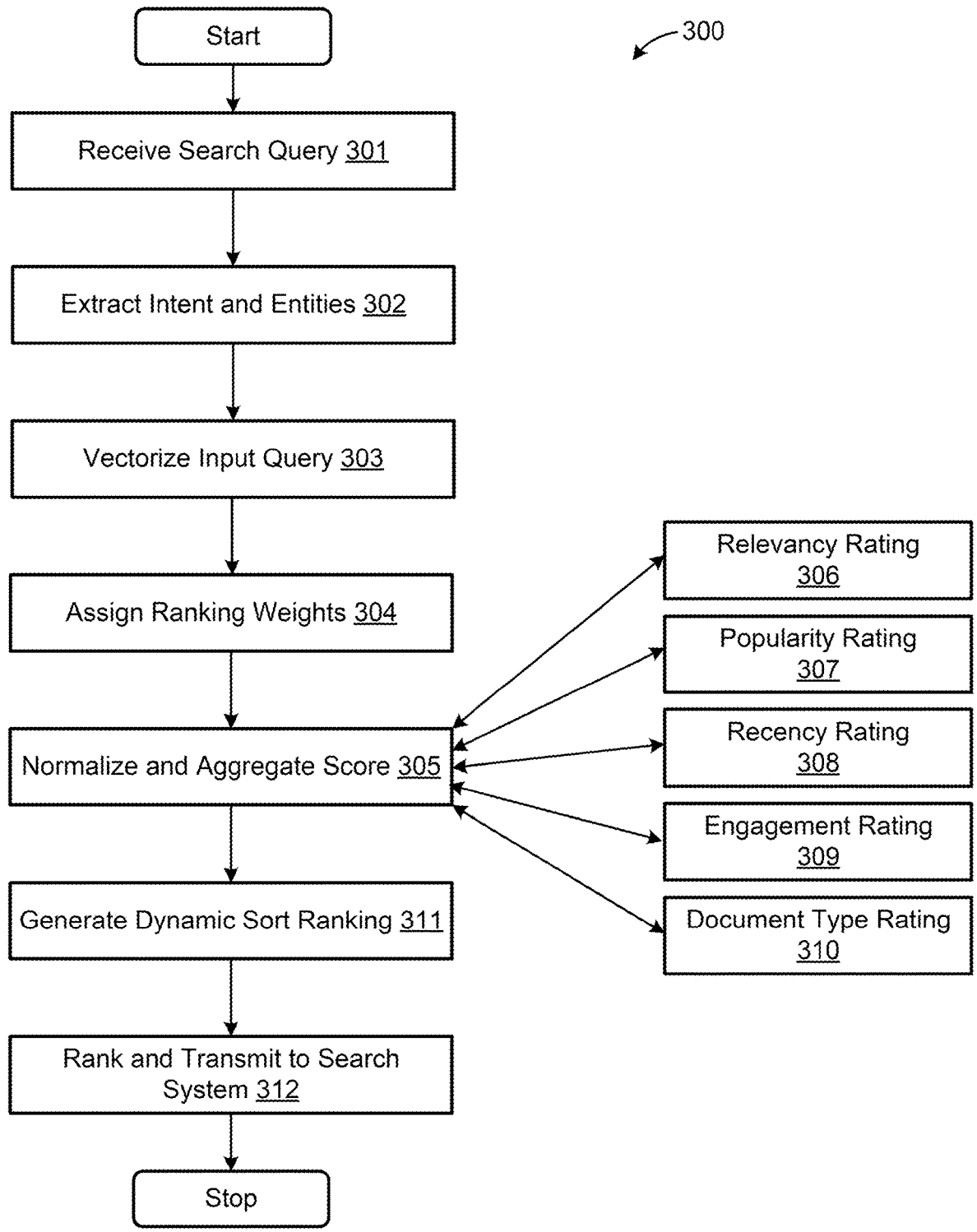
FIG. 3 shows a process for generating a ranking of code snippets, according to some embodiments.

FIG. 3 shows a process 300 for dynamic search listing ranking of code snippets, according to some embodiments. It should be understood that the method steps are shown as a reference only and sequence of the method steps should not be construed as limiting. The method steps can include any additional steps in any order. Although the process 300 may be implemented in any system, the process 300 as shown is provided in reference to the system 100 for ease of explanation.

In step 301, an input search query is received from a user by the system 100. The input search query may be received by the system 100 through the search portal 101. The input search query may describe details of what type of code snippets the user is searching for. For example, the user may input a search query such as "how to index pdf file in elastic search index using java" or "how to extract a break tag text in python" into the search portal 101.

In step 302, the system 100 extracts intent and entities from the search query received in step 302. For example, if the search query received at step 301 is "how to index pdf file in elastic search index using java," the system 100 may determine that the intent is "index" and the entities include "elastic search" which is a library and "java" which is a programming language. As another example, if the search query received at step 301 is "how to extract a break tag text in python", the system 100 may determine the intent is "extract a break tag text" and the entities includes python which is another programing language.

In step 303, the system 100 vectorizes the input query received at step 301. In some embodiments, the input query is vectorized by the vectorizer 105. The vectorizer 105 may be configured to convert the user query to a corresponding vector of numerical values which represent the input query received from the user. In some embodiments, the vectorized input query may be stored in the vector database 119.

In step 304, the system 100 receives the code snippet lists as well as user preferences. Then the ranking parameters are captured from the search system and weights are assigned to the ranking parameters based on the user preferences, code snippet list, and ranking request. In step 305, the system 100 normalizes and aggregates the score for one or more code snippets. In some embodiments, step 305 may specifically be performed by the normalizer and score aggregator 110 which is configured to receive a list of code snippets from the search or a similar listing system and a request for ranking parameters for which ranking information is requested. Based on the ranking parameters, the normalizer and score aggregator 110 calls all or some of a number of services 121 such as the relevancy rating service 111, a popularity rating service 112, the recency rating service 113, the engagement rating service 114, and the document type rating service 115 to compute a score for the code snippet at step 305. To perform step 305, different rating services 121 are called based on non-zero weighted ranking parameters. In step 306 the relevancy score is computed. In step 307, the popularity score is computed. In step 308, the recency score is computed based on when the code snippet was last used or published. In step 309, the engagement score is computed. In step 310, the document type score is computed. In step 308, the security and vulnerability score are computed.

In step 311, based on all the scores and the individual weights, the ranking for each code snippet is computed. In some embodiments user preferences such as programming language, license, security and support are taken into account when determining the ranking for each code snippet. A user preference is collected from a user directly during the user's sign up to the search system. The user preference is also built indirectly when the user selects a search result item from the search result page. For example, if the user selects a code snippet from search result page then the component's attributes such as programming language, security, license and support are added to user preference. If the user is anonymous, then an anonymous user preference profile may be created.

In some embodiments, a ranking model is used to improve the relevance ranking of the search result list generated at step 311. This model is built from a historical search query dataset as well as a human annotated dataset with additional features such as code snippets name, readme text, description and rating scores. The ranking model ranks search result list based on the search query relevance. Finally, a user preference may be used to re-rank the result list based on user preference, if it exists.

In step 312, the list of code snippets is sorted and ranked based on the dynamic sort ranking scores and is transmitted to the search system. The ranked list of code snippets may be used to generate and present a user interface that includes an ordered list of the code snippets based on the combined score for each of the code snippets. In some embodiments, the user interface includes various options to facilitate extracting and reusing the code snippets in a new software program. For example, the user interface may include selectable options that allow a user to copy or export a selected code snippet from the source code repository, import the code snippet into a software development program, or otherwise facilitate reusing the selected code snippet in a new software program.

Figure 4A:
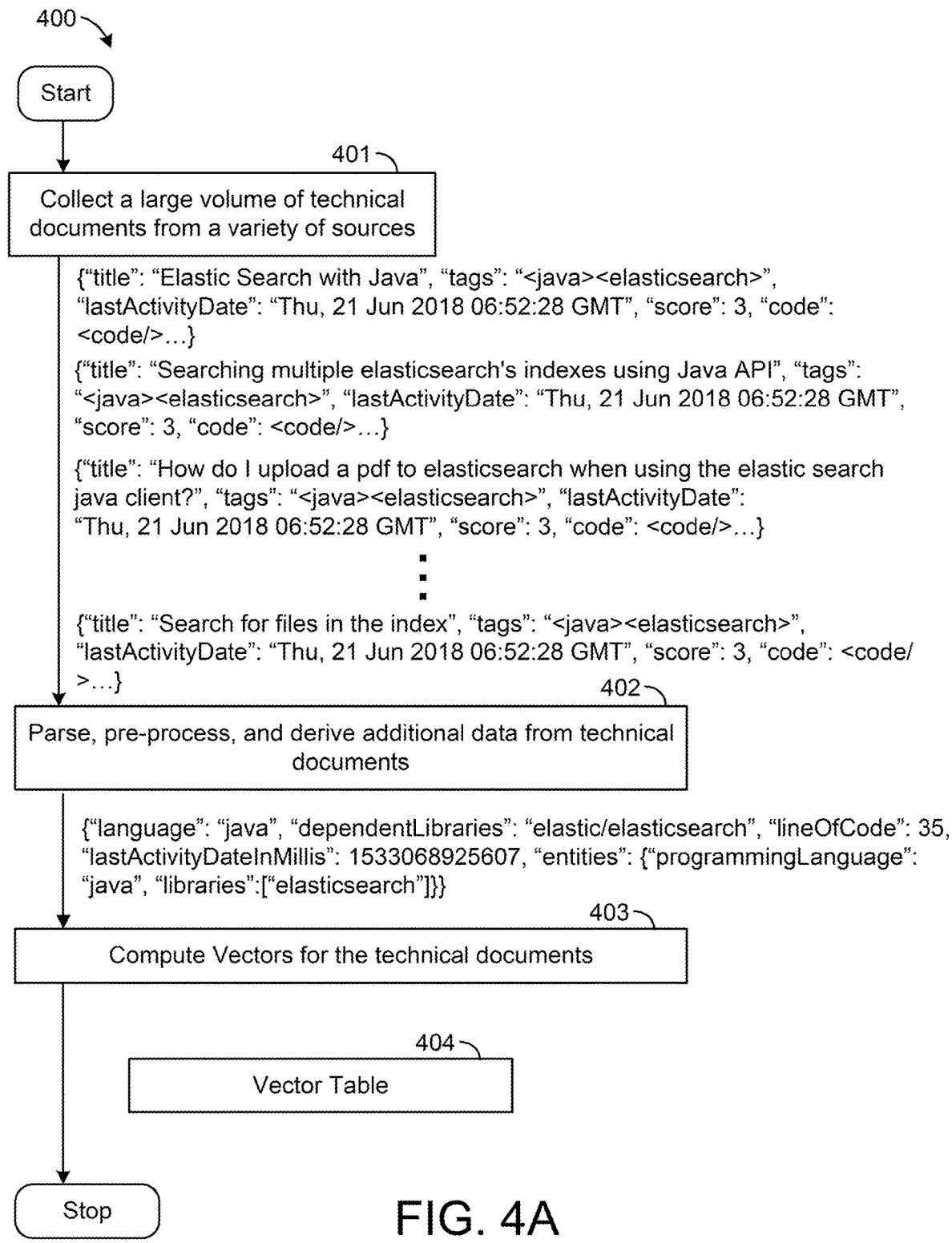

FIG. 4A shows a process 400 for pre-processing and vectorizing technical documents containing code snippets, according to some embodiments. It should be understood that the method steps are shown as a reference only and sequence of the method steps should not be construed as limiting. The method steps can include any additional steps in any order. Although the process 400 may be implemented in any system, the process 400 as shown is provided in reference to the system 100 for ease of explanation.

In step 401, a large volume of technical documents from a variety of sources are collected and stored in the database 117. In some embodiments, step 401 is performed by the system 100 prior to conducting a search (e.g., to gather and store the technical documents that can be pre-processed in subsequent steps of the process 400). In some embodiments, the large volume of technical documents may include 30 million or more software related technical documents which contain code snippets. The technical documents may be received in the format below:

```
{"title": "Elastic Search with Java", "tags":
"<java><elasticsearch>", "lastActivityDate":
"Thu, 21 Jun 2018 06:52:28 GMT", "score": 3, "code":
<code/>...}
```

-continued

```
{"title": "Searching multiple elasticsearch's indexes using Java
API", "tags": "<java><elasticsearch>", "lastActivityDate":
"Thu, 21 Jun 2018 06:52:28 GMT", "score": 3, "code":
<code/>...}
{"title": "How do I upload a pdf to elasticsearch when using the
elastic search java client?", "tags": "<java><elasticsearch>",
"lastActivityDate": "Thu, 21 Jun 2018 06:52:28 GMT", "score": 3,
"code": <code/>...}
{"title": "Search for files in the index", "tags":
"<java><elasticsearch>", "lastActivityDate":
"Thu, 21 Jun 2018 06:52:28 GMT", "score": 3, "code":
<code/>...}
```

In step 402, the system 100 parses, pre-processes, and derives additional data from the technical documents. Specifically, the code snippets may be parsed and extracted from various different source code repositories and technical fora within the large volume of technical documents. For example, the technical documents may be extracted or parsed as shown below:

```
{"language": "java", "dependentLibraries": "elastic/elasticsearch",
"lineOfCode": 35, "lastActivityDateInMillis": 1533068925607,
"entities": {"programmingLanguage": "java",
"libraries":["elasticsearch"]}}
```

In step 403, the system 100 computes vectors for technical documents collected at step 401. A vector table 404 is shown in FIG. 5B which includes a first column 405 which includes a descriptor (e.g., title, tag, etc.) of the technical document and a second column 406 which includes the associated vector for the technical document.

Figure 5A:
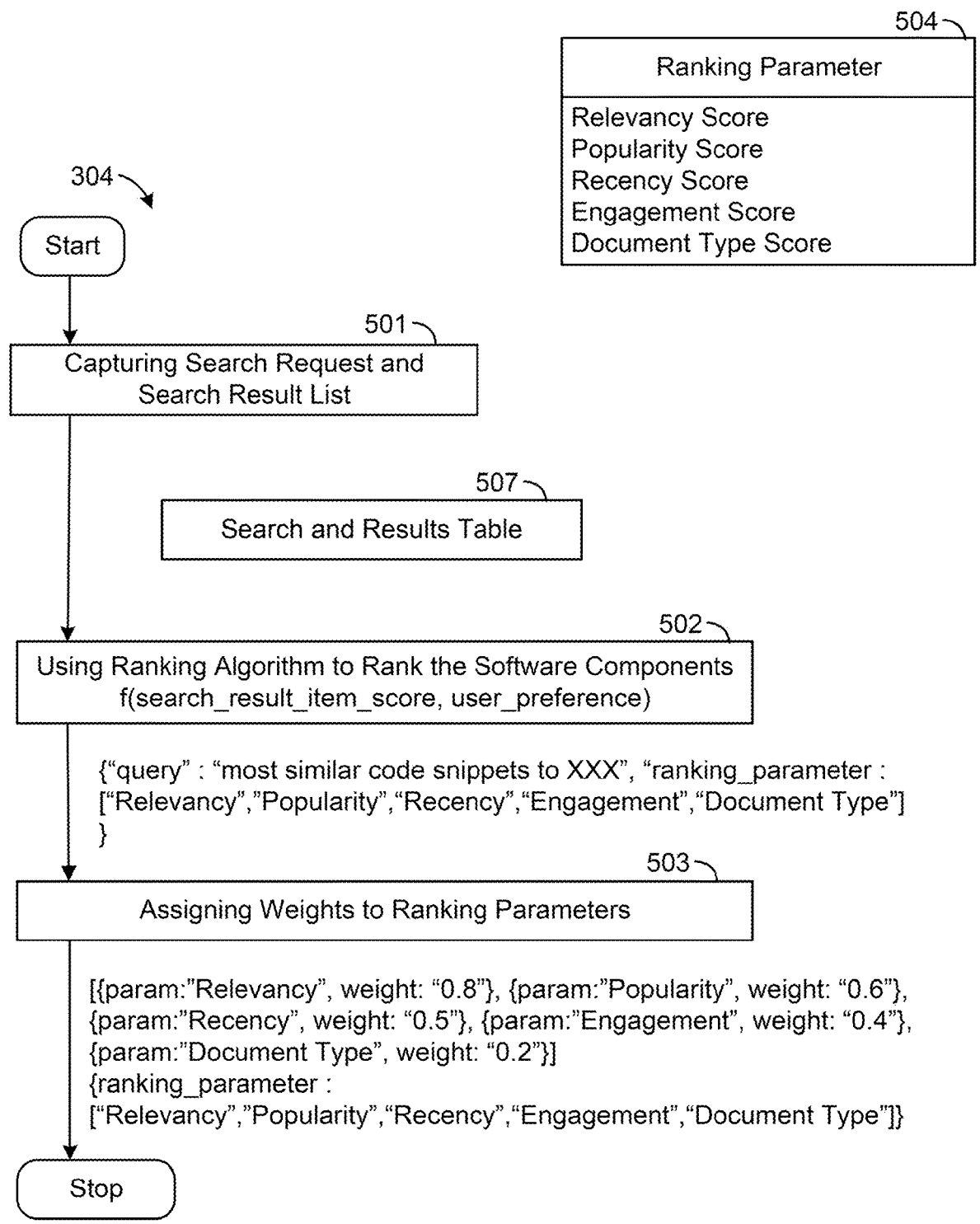

FIG. 5 illustrates step 304 of process 300 in greater detail and can be performed to assign ranking weights used in dynamic search listing ranking of code snippets, according to some embodiments. It should be understood that the method steps are shown as a reference only and sequence of the method steps should not be construed as limitation. The method steps can include any additional steps in any order.

In some embodiments, in step 501, a search and results table 507 are captured from the search system. In some embodiments, the search and results table 507 includes an input search query 505 and a search result list 506. The input search query 505 and search result list 506 are shown in FIG. 5B. The input search query is used to determine ranking parameters. The ranking parameters include a relevancy score of a code snippet, a popularity score of a code snippet, a recency score of a code snippet, an engagement score of a code snippet, and a document type score of a code snippet, a security and vulnerability score of a code snippet.

In step 502 the ranking parameters are identified based on the received input search query. The step 502 uses a ranking algorithm machine learning model trained on historical search query dataset as well as human annotated dataset. The ranking algorithm model tunes one or more ranking parameters (e.g., relevancy, popularity, recency, engagement, document type, etc.) based on training data to determine appropriate weights to assign to each of the parameters to yield better search results which balance all the mentioned factors. For example, for the search query "how to index pdf file in elastic search index using java" the ranking parameters are set, in order of priority, as "relevancy," "engagement," "recency," "engagement," and "document type." The sample json output structure from step 502 is shown below:

```
{
    "query" : "how to index pdf file in elastic search index using java",
    "ranking_parameter :
    ["Relevancy","Popularity","Recency","Engagement",
    "Document Type"]
}
```

In some embodiments, in step 503, the ranking parameters which were identified in the step 501 are assigned with weights. These weights may assist in identifying the right ranking option to the input query. Higher weight is assigned to first item (e.g., "Relevancy") of ranking parameter list retrieved from step 502. Subsequent weights in a gradual decreasing order are assigned to the subsequent items in the ranking parameter list (e.g., "Popularity", "Recency", "Engagement", "Document Type"). For example, for the search query "how to index pdf file in elastic search index using java," the following is the output from the step 503:

```
}
    "ranking_parameter :
    ["Relevancy","Popularity","Recency","Engagement",
    "Document Type"]
    "ranking_param_weight":[{param:"Relevancy", weight: "0.8"},
    {param:"Popularity", weight: "0.6"}, {param:"Recency",
    weight: "0.5"},
    {param:"Engagement", weight: "0.4"},
    {param:"Document Type", weight:
    "0.2"}]
}
```

Figure 6:
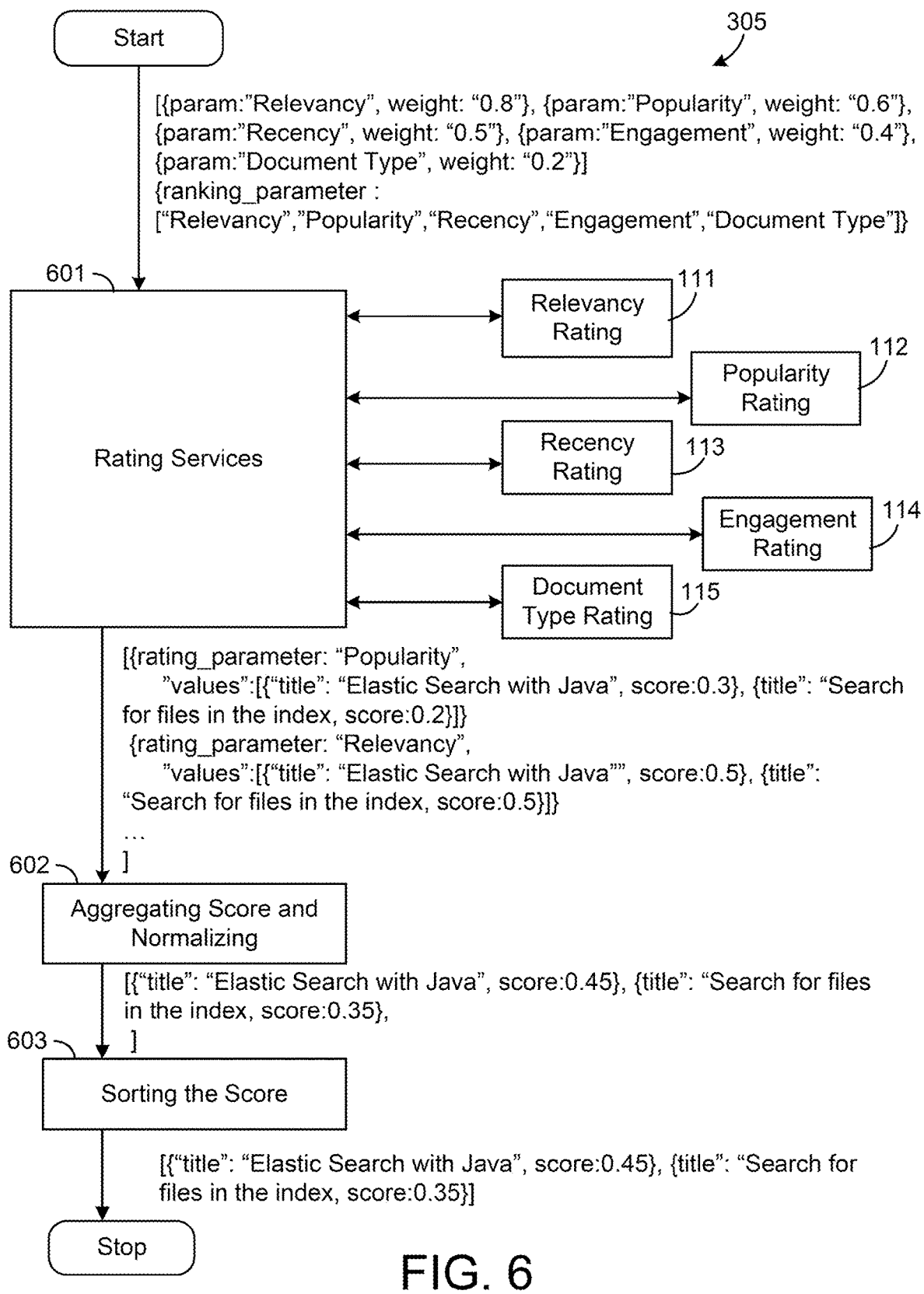
FIG. 6 shows a process for normalizing and aggregating scores for one or more code snippets, according to some embodiments.

FIG. 6 illustrates step 305 of process 300 in a more detailed method 600 and can be performed to normalize and aggregate scores for one or more code snippets, according to some embodiments. It should be understood that the process steps are shown as a reference only and sequence of the method steps should not be construed as limitation. The method steps can include any additional steps in any order. In an example, a one processor may execute a stored program comprising a sequence of program instructions that enables the processor to perform the method of the present subject matter. The computer program may be stored in a computer readable medium.

In some embodiments, in step 601, a rating service combines different parameter rankings as determined by the rating services 121 such as the relevancy rating service 111, popularity rating service 112, recency rating service 113, engagement rating service 114, and document rating service 115. At step 601, the system 100 provides the search result list with rating scores to an appropriate ranking parameter category list. Any search result items which are not part of the rating selector are placed under an "other" category. For example, for the search query "how to index pdf file in elastic search index using java" and ranking parameter "Relevancy," "Popularity," "Recency," "Engagement," and "Document Type," the sample rating service selector output will be as given below.

```
[
    {
    "rating_parameter: "Popularity",
    "values":[{"title": "Elastic Search with Java", score:0.3}, {title":
    "Search for files in the index, score:0.2}]
```

```
    },
    {
    "rating_parameter: "Relevancy",
    "values":[{"title": "Elastic Search with Java"", score:0.5}, {title":
    "Search for files in the index, score:0.5}]
    },
    {
    "rating_parameter: "Recency",
    "values":[{"title": "Elastic Search with Java", score:0.4}, {title":
    "Search for files in the index, score:0.6}]
    },
    {
    "rating_parameter: "Engagement",
    "values":[{"title": "Elastic Search with Java", score:0.5}, {title":
    "Search for files in the index, score:0.2}]
    },
    {
    "rating_parameter: "Document Type",
    "values":[{"title": "Elastic Search with Java", score:0.3}, {title":
    "Search for files in the index, score:0.6}]
    },
]
```

In some embodiments, in step 602, the rating scores produced by step 601 are aggregated against the name field, and the scores are added and normalized to unit normalization. After the data is processed, the sample output may appear as shown below. In this example, rating scores associated with a title "Elastic Search with Java" are combined together with a single score of 0.45.

```
[
    {"title": "Elastic Search with Java", score:0.45}, {title":
    "Search for files in the index, score:0.35}...,
]
```

In some embodiments, in step 603, the scores are sorted in descending order to provide the ranking to search listing of code snippets. For example, the following may be an output of step 603.

```
[
    {"title": "Elastic Search with Java", score:0.45}, {title":
    "Search for files in the index, score:0.35}...,
]
```

Figure 7A:
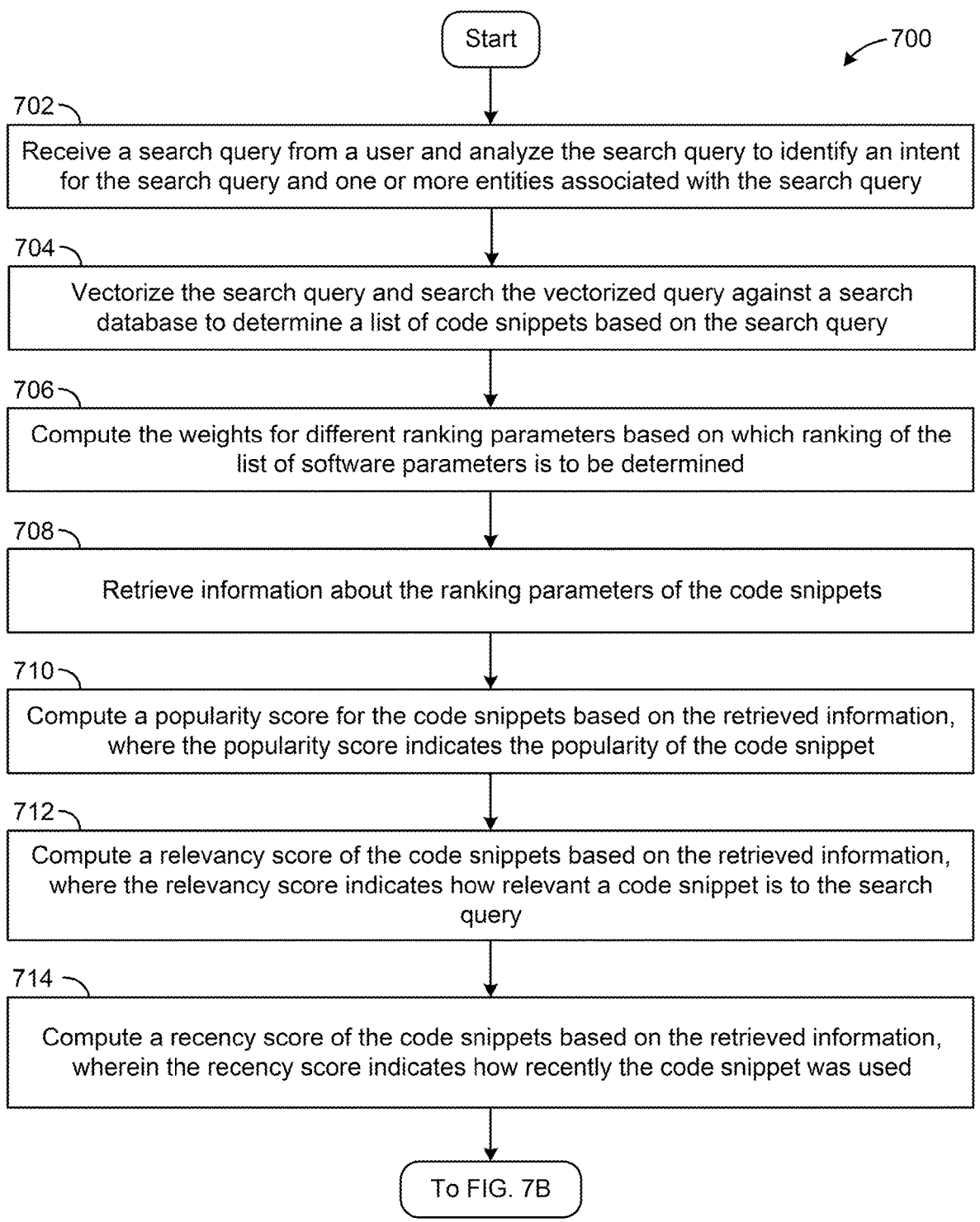
FIGS. 7A-7B show a high-level process for searching and ranking code snippets, according to some embodiments.
Figure 7B:
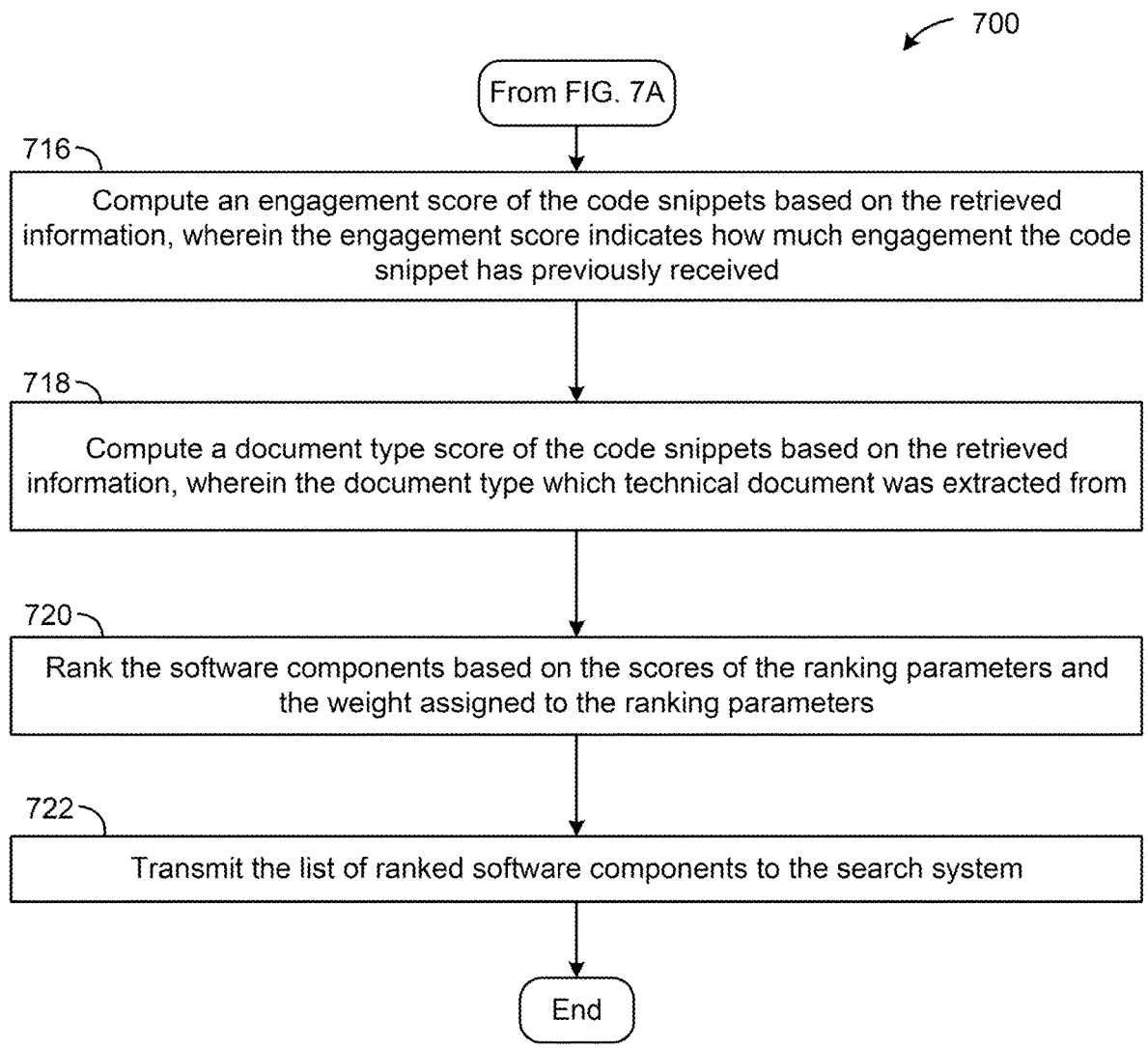

FIGS. 7A-7B show a high-level process 700 for dynamic search listing ranking of code snippets, according to some embodiments. It should be understood that the method steps are shown as a reference only and sequence of the method steps should not be construed as limitation. The method steps can include any additional steps in any order. Although, the process 700 may be implemented in any system, the example process 700 is provided in reference to the system 100 for ease of explanation.

In some embodiments, in the step 702, a search query from a user is received and analyzed to identify an intent for the search query and one or more entities associated with the search query. In an example, the user input as well as user preferences and ranking parameters are captured from a search system. In some embodiments, a list of code snippets is determined based on the search query received at step 702. Specifically, at step 704, the search query is vectorized as explained above. The vectorized search query may then be searched against a database containing code snippets (e.g., code snippet and meta data storage 118) to determine a list of code snippets related to the search query.

At step 706, the weights for the different ranking parameters based on which a desired ranking of the list of the code snippets is computed. The ranking parameters include relevancy score of a code snippet, a popularity score of a code snippet, a recency score of a code snippet, a engagement score of a code snippet, and a document type score of a code snippet. In an example, weights are assigned based on the user preferences, code snippet list and ranking request. At step 708, information about the non-zero weighted ranking parameters are retrieved from the database 117. The information may be saved in a storage, such as database 117. At step 710, a popularity score for each of the code snippets is computed based on the retrieved information, wherein the popularity score indicates how popular a code snippet is. At step 712, a relevancy score of the code snippets is computed based on the retrieved information, wherein the relevancy score indicates how relevant the code snippet is to the search query. At step 714, the recency score of a code snippet is determined based on the retrieved information, wherein the recency score indicates how recently the code snippet was developed or released. At step 716, an engagement score of the code snippets is determined based on the retrieved information, wherein the engagement score indicates how much engagement the code snippet has received. At step 718, a document type score of the code snippets is determined based on the retrieved information, wherein the document type score indicates the reliability or trustworthiness of the document the code snippet was extracted from. At step 720, the code snippets are ranked based on the scores of the ranking parameters and the weight assigned to the ranking parameters. In the step 722, the list of ranked code snippets is transmitted to the search system which may display the ranked code snippets to a user.

As will be appreciated by one of skilled in the art, the present disclosure may be embodied as a method and system. In the specification, there has been disclosed exemplary embodiments of the invention. Although specific terms are employed, they are used in a generic and descriptive sense only and not for purposes of limitation of the scope of the subject matter described herein.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for automatically generating search list rankings of code snippets using one or more machine learning models, the system comprising:

one or more processors and memory storing instructions that, when executed by the one or more processors, cause the one or more processors to perform operations comprising:

searching one or more source code repositories to identify a plurality of code snippets in response to a search query;

assigning a plurality of weight values to a plurality of ranking parameters, each of the plurality of ranking parameters corresponding to a different type of rating score for plurality of code snippets;

processing the plurality of code snippets using the one or more machine learning models to generate a plurality of rating scores for each of the plurality of code snippets, wherein each rating score of the plurality of rating scores applies to a corresponding ranking parameter of the plurality of ranking parameters;

generating a combined score for each of the plurality of code snippets, wherein the combined score for a code snippet is generated by combining the plurality of rating scores for the code snippet according to the plurality of weight values assigned to the corresponding ranking parameters; and generating and presenting a user interface comprising an ordered list of the plurality of code snippets based on the combined score for each of the plurality of code snippets, wherein the ranking parameters comprise a popularity score, a relevancy score, a recency score, an engagement score, and a document type score, wherein:

the popularity score is a standardized measurement relative to a popularity of a code snippet;

the relevancy score is a standardized measurement relative to a relevance of a code snippet to the search query;

the recency score is a standardized measurement relative to how recently a code snippet was used;

the engagement score is a standardized measurement relative to an amount of engagement a code snippet receives; and the document type score is a standardized measurement relative to a type of document from which the code snippet was derived.

2. The system of claim 1, wherein the popularity score, the relevancy score, the recency score, the engagement score, and the document type score are normalized across provider data and third party data by a machine learning model.

3. The system of claim 1, wherein the popularity score is determined based on a number of views and/or user downloads of a code snippet across different providers of the code snippet, the different providers of the code snippet comprising a plurality of code repositories.

4. The system of claim 1, wherein the relevancy score is determined by computing a similarity between the code snippet and the search query based on a L2 Euclidian distance.

5. The system of claim 1, wherein the engagement score is determined based on a number of clicks, comments, likes, and shares of a code snippet across different providers of the code snippet, the different providers of the code snippet comprising a plurality of code repositories.

6. The system of claim 1, wherein the operations further comprise:

scanning, by a data-crawler, at least one of public repositories, cloud providers, Q&A sites, or review sites to retrieve information on popularity, relevancy, recency, engagement, and document type information regarding a code snippet; and storing, by the data-crawler, the information to the one or more machine learning models.

7. The system of claim 1, the operations further comprising:

receiving a large volume of technical documents from a variety of sources, wherein the large volume of technical documents comprises at least 30 million documents;

pre-processing the large volume of technical documents to extract relevant data;

semantically vectorizing the technical documents using a pre-trained machine learning model; and storing the vectorized technical documents in a vector database.

8. A method for automatically generating search list rankings of code snippets, the method comprising:

searching one or more source code repositories to identify a plurality of code snippets in response to a search query;

assigning a plurality of weight values to a plurality of ranking parameters, each of the plurality of ranking parameters corresponding to a different type of rating score for plurality of code snippets;

processing the plurality of code snippets using one or more machine learning models to generate a plurality of rating scores for each of the plurality of code snippets, wherein each rating score of the plurality of rating scores applies to a corresponding ranking parameter of the plurality of ranking parameters;

generating a combined score for each of the plurality of code snippets, wherein the combined score for a code snippet is generated by combining the plurality of rating scores for the code snippet according to the plurality of weight values assigned to the corresponding ranking parameters; and generating and presenting a user interface comprising an ordered list of the plurality of code snippets based on the combined score for each of the plurality of code snippets, wherein the ranking parameters comprise a popularity score, a relevancy score, a recency score, an engagement score, and a document type score, wherein:

the popularity score is a standardized measurement relative to a popularity of a code snippet;

the relevancy score is a standardized measurement relative to a relevance of a code snippet to the search query;

the recency score is a standardized measurement relative to how recently a code snippet was used;

the engagement score is a standardized measurement relative to an amount of engagement a code snippet receives; and the document type score is a standardized measurement relative to a type of document from which the code snippet was derived.

9. The method of claim 8, wherein the popularity score is determined based on a number of views and/or user downloads of a code snippet across different providers of the code snippet, the different providers of the code snippet comprising a plurality of code repositories.

10. The method of claim 8, wherein the relevancy score is determined by computing a similarity between the code snippet and the search query based on a L2 Euclidian distance.

11. The method of claim 8, wherein the engagement score is determined based on a number of clicks, comments, likes, and shares of a code snippet across different providers of the code snippet, the different providers of the code snippet comprising a plurality of code repositories.

12. The method of claim 8, wherein the method further comprises:
- scanning, by a data-crawler, at least one of public repositories, cloud providers, Q&A sites, or review sites to retrieve information on popularity, relevancy, recency, engagement, and document type information regarding a code snippet; and
- storing, by the data-crawler, the information to the one or more machine learning models.

13. The method of claim 8, further comprising:
- receiving a large volume of technical documents from a variety of sources, wherein the large volume of technical documents comprises at least 30 million documents;
- pre-processing the large volume of technical documents to extract relevant data;
- semantically vectorizing the technical documents using a pre-trained machine learning model; and
- storing the vectorized technical documents in a vector database.

14. One or more non-transitory computer-readable media storing instructions thereon, wherein the instructions, when executed by one or more processors, cause the one or more processors to:
- search one or more source code repositories to identify a plurality of code snippets in response to a search query;
- assign a plurality of weight values to a plurality of ranking parameters, each of the plurality of ranking parameters corresponding to a different type of rating score for plurality of code snippets;
- process the plurality of code snippets using one or more machine learning models to generate a plurality of rating scores for each of the plurality of code snippets, wherein each rating score of the plurality of rating scores applies to a corresponding ranking parameter of the plurality of ranking parameters;
- generate a combined score for each of the plurality of code snippets, wherein the combined score for a code snippet is generated by combining the plurality of rating scores for the code snippet according to the plurality of weight values assigned to the corresponding ranking parameters; and
- generate and present a user interface comprising an ordered list of the plurality of code snippets based on the combined score for each of the plurality of code snippets, wherein the ranking parameters comprise a popularity score, a relevancy score, a recency score, an engagement score, and a document type score, wherein:
- the popularity score is a standardized measurement relative to a popularity of a code snippet;
- the relevancy score is a standardized measurement relative to a relevance of a code snippet to the search query;
- the recency score is a standardized measurement relative to how recently a code snippet was used;
- the engagement score is a standardized measurement relative to an amount of engagement a code snippet receives; and
- the document type score is a standardized measurement relative to a type of document from which the code snippet was derived.

15. The one or more non-transitory computer-readable media of claim 14, wherein the popularity score is determined based on a number of views and/or user downloads of a code snippet across different providers of the code snippet, the different providers of the code snippet comprising a plurality of code repositories.

16. The one or more non-transitory computer-readable media of claim 14, wherein the relevancy score is determined by computing a similarity between the code snippet and the search query based on a L2 Euclidian distance.

17. The one or more non-transitory computer-readable media of claim 14, wherein the engagement score is determined based on a number of clicks, comments, likes, and shares of a code snippet across different providers of the code snippet, the different providers of the code snippet comprising a plurality of code repositories.

* * * * *